(12) United States Patent
Hong et al.

(10) Patent No.: US 12,236,114 B2
(45) Date of Patent: Feb. 25, 2025

(54) RESOURCE ISOLATION IN COMPUTATIONAL STORAGE DEVICES

(71) Applicant: Samsung Electronics Co., Ltd., Suwon-si (KR)

(72) Inventors: Ilgu Hong, Santa Clara, CA (US); Changho Choi, San Jose, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/608,871

(22) Filed: Mar. 18, 2024

(65) Prior Publication Data
US 2024/0220139 A1  Jul. 4, 2024

Related U.S. Application Data

(63) Continuation of application No. 17/558,587, filed on Dec. 21, 2021, now Pat. No. 11,941,266.
(Continued)

(51) Int. Cl.
*G06F 3/06* (2006.01)

(52) U.S. Cl.
CPC .......... *G06F 3/0631* (2013.01); *G06F 3/0619* (2013.01); *G06F 3/0659* (2013.01); *G06F 3/0679* (2013.01)

(58) Field of Classification Search
CPC .... G06F 3/0631; G06F 3/0619; G06F 3/0659; G06F 3/0679; G06F 3/0605;
(Continued)

(56) References Cited

U.S. PATENT DOCUMENTS 6,223,289 B1   4/2001   Wall et al.
7,690,026 B2   3/2010   Zhu et al.
(Continued)

FOREIGN PATENT DOCUMENTS

CN   110377415 A   10/2019
CN   113037529 A   6/2021
(Continued)

OTHER PUBLICATIONS

Dumitrescu, Catalin L. et al., "GRUBER: A Grid Resource Usage SLA Broker," Topics in Cryptology—CT-RSA 2020: The Cryptographers' Track at the RSA Conference 2020, vol. 3648, Aug. 2005, pp. 465-474.
(Continued)

*Primary Examiner* — Sean D Rossiter
(74) *Attorney, Agent, or Firm* — Renaissance IP Law Group LLP

(57) ABSTRACT

A method includes receiving, at a controller of a computational storage (CS) device, a request to allocate computational storage to an application of a host device. The request includes a resource set ID associated with the application. The method further includes identifying a memory range within a memory region of the CS device. The method further includes storing, in a data structure associated with the resource set ID, an association between a memory range identifier (ID) of the memory range, the memory region, and an offset within the memory region. The method further includes sending the memory range ID to the host device.

20 Claims, 9 Drawing Sheets

Related U.S. Application Data

(60) Provisional application No. 63/270,049, filed on Oct. 20, 2021.

(58) Field of Classification Search
CPC ...... G06F 3/0637; G06F 3/0671; G06F 12/08; G06F 2209/5011; G06F 3/0622; G06F 9/546; G06F 12/1458; G06F 9/5016
See application file for complete search history.

(56) References Cited

U.S. PATENT DOCUMENTS

| | | | |
|---|---|---|---|
| 7,891,560 | B2 | 2/2011 | Hammad |
| 8,327,141 | B2 | 12/2012 | Vysogorets et al. |
| 8,458,776 | B2 | 6/2013 | Galvin et al. |
| 8,509,431 | B2 | 8/2013 | Schmidt et al. |
| 8,527,764 | B2 | 9/2013 | Kiran et al. |
| 8,533,803 | B2 | 9/2013 | Cha et al. |
| 8,700,892 | B2 | 4/2014 | Bollay et al. |
| 8,843,753 | B2 | 9/2014 | Yegin et al. |
| 8,850,545 | B2 | 9/2014 | Cha et al. |
| 8,958,559 | B2 | 2/2015 | Medina et al. |
| 9,781,054 | B1 | 10/2017 | Greenfield et al. |
| 10,129,031 | B2 | 11/2018 | Choyi et al. |
| 10,439,991 | B2 | 10/2019 | Bone et al. |
| 10,606,648 | B2 | 3/2020 | Parks et al. |
| 10,931,595 | B2 | 2/2021 | Ren |
| 11,025,597 | B2 | 6/2021 | Zhang et al. |
| 11,296,956 | B2 | 4/2022 | Zhang et al. |
| 11,442,637 | B1* | 9/2022 | Harduf ................. G06F 9/4406 |
| 2014/0068624 | A1 | 3/2014 | Fuller et al. |
| 2016/0173529 | A1 | 6/2016 | Baig et al. |
| 2017/0078275 | A1 | 3/2017 | Slovetskiy |
| 2019/0107965 | A1 | 4/2019 | Deval et al. |
| 2019/0377694 | A1* | 12/2019 | Muthukrishnan ... G06F 12/1458 |
| 2020/0328984 | A1 | 10/2020 | Sun et al. |
| 2020/0371700 | A1* | 11/2020 | Stabrawa ............. G06F 3/0631 |
| 2020/0403994 | A1 | 12/2020 | Bitterfeld et al. |
| 2021/0377814 | A1 | 12/2021 | Sillanpaa |
| 2021/0389890 | A1* | 12/2021 | Trika .................... G06F 3/0659 |
| 2023/0024949 | A1* | 1/2023 | Ammari ............. G06F 13/1668 |
| 2023/0319901 | A1 | 10/2023 | Ozturk et al. |

FOREIGN PATENT DOCUMENTS

| | | |
|---|---|---|
| EP | 3987723 A1 | 4/2022 |
| KR | 20200106036 A | 9/2020 |
| TW | 1728571 B | 5/2021 |
| TW | 202218477 A | 5/2022 |
| WO | 2015034435 A1 | 3/2015 |
| WO | 2021225087 A1 | 11/2021 |

OTHER PUBLICATIONS

European Extended Search Report for Application No. 22202416.8, mailed Feb. 8, 2023.
European Extended Search Report for Application No. 23186960.3, mailed Mar. 13, 2024.
Notice of Allowance for U.S. Appl. No. 17/558,587, mailed Nov. 20, 2023.
Office Action for U.S. Appl. No. 17/558,587, mailed Jun. 16, 2023.
Xi, Xiong et al., "SILVER: Fine-Grained and Transparent Protection Domain Primitives in Commodity OS Kernel," RAID 2013, SAT 2015 18th International Conference, Lecture Notes in Computer Science Book Series, LNSC, vol. 8145, Oct. 2013, pp. 103-122.

* cited by examiner

TO FIG. 2B

RESOURCE ISOLATION IN COMPUTATIONAL STORAGE DEVICES

CROSS-REFERENCE TO RELATED APPLICATION(S)

The present application is a continuation of U.S. patent application Ser. No. 17/558,587, filed Dec. 21, 2021, which claims priority to and the benefit of U.S. Provisional Patent Application Ser. No. 63/270,049, filed Oct. 20, 2021, the entire contents of all which are incorporated herein by reference.

FIELD

The present disclosure generally relates to systems and methods for resource isolation in computational storage devices.

BACKGROUND

Computational storage devices provide computation functions and data storage. Accordingly, a host device may store data at and offload computations to a computational storage device. However, one application of the host device may modify a resource of the computational storage device used by another application. This may lead to unpredictable execution results for the applications.

The above information disclosed in this background section is only for enhancement of understanding of the background of the disclosure and therefore it may contain information that does not constitute prior art.

SUMMARY

In various embodiments, described herein include systems, methods, and apparatuses related to resource isolation in computational storage devices.

A method includes receiving, at a controller of a computational storage (CS) device, a request to allocate computational storage to an application of a host device. The request includes a resource set ID associated with the application. The method further includes identifying a memory range within a memory region of the CS device. The method further includes storing, in a data structure associated with the resource set ID, an association between a memory range identifier (ID) of the memory range, the memory region, and an offset within the memory region. The method further includes sending the memory range ID to the host device.

A computational storage (CS) device includes a memory and a controller. The controller is configured to receive a request to allocate computational storage to an application of a host device. The request includes a resource set ID associated with the application. The controller is further configured to identify a memory range within a memory region of the memory. The controller is further configured to store, in a data structure associated with the resource set ID, an association between a memory range identifier (ID) of the memory range, the memory region, and an offset within the memory region. The controller is further configured to send the memory range ID to the host device.

A system includes a host device configured to store a session context associated with an application executing at the host device. The session context is associated with a resource set ID. The host device is further configured to in response to receiving a request to allocate computational storage from the application, insert the resource set ID into the request. The system further includes a computational storage device including a memory and a controller. The controller is configured to receive the request to allocate computational storage. The controller is further configured to identify a memory range within a memory region of the memory. The controller is further configured to store, in a data structure associated with the resource set ID, an association between a memory range identifier (ID) of the memory range, the memory region, and an offset within the memory region. The controller is further configured to send the memory range ID to the host device.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
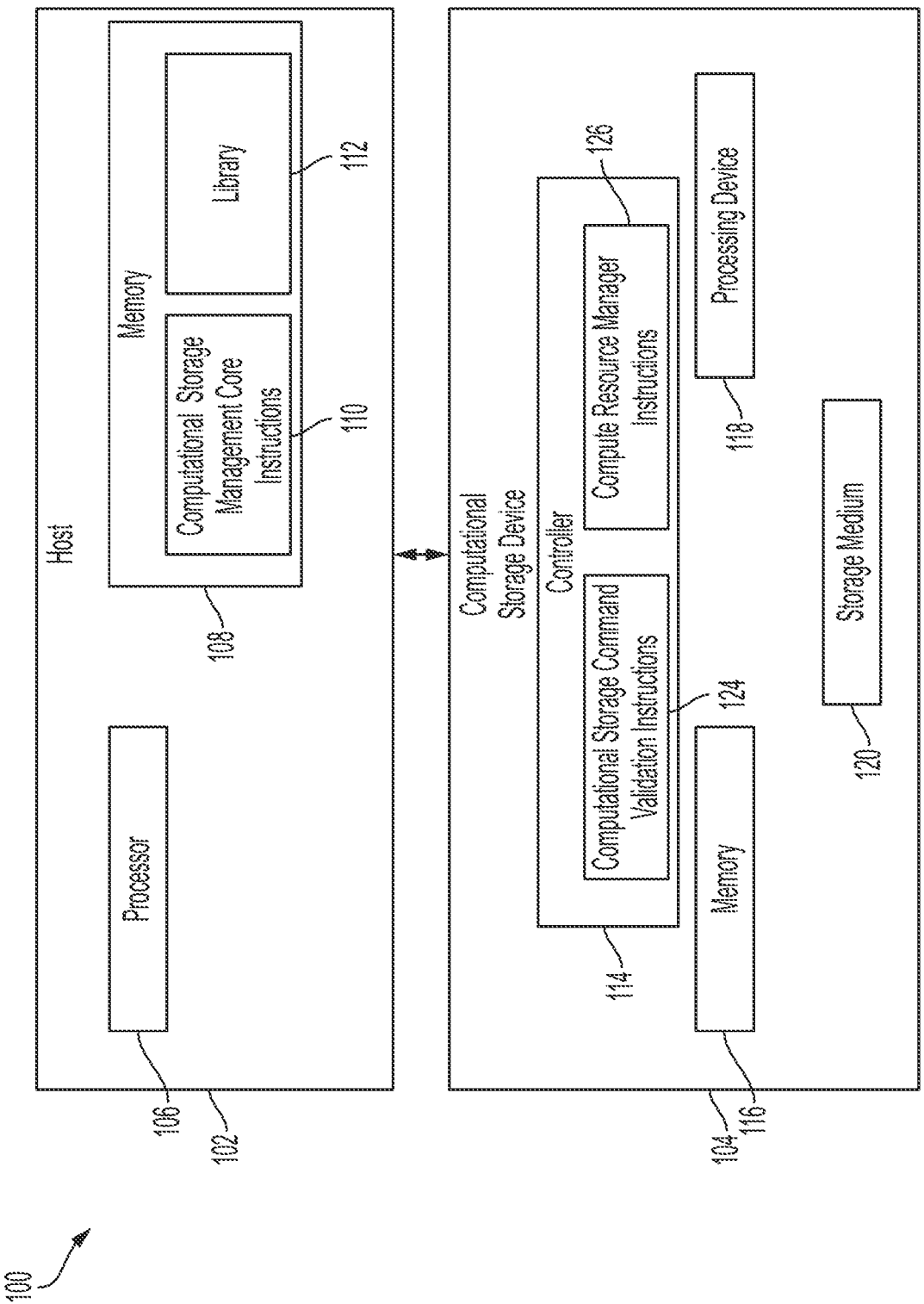
FIG. 1 is a block diagram of a system for providing resource isolation in computational storage devices.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF DRAWINGS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As used herein, a computational storage (CS) device refers to a storage device that supports computational tasks. For example, a CS device may include a storage element (e.g., non-volatile memory, such as flash memory, a hard disk drive, etc.) and a compute element (e.g., a central processor unit (CPU), graphics processor unit (GPU), a field programmable gate array (FPGA), an application specific integrated circuit (ASIC) (such as a tensor processing unit), processor core, etc.) and be configured to support storage of data at the compute element and execution of computational tasks at the compute element. Accordingly, a CS device may provide storage capabilities to a CS client (e.g., a computing device) and may support offloading of computational tasks from the CS client to the CS device.

More than one application may execute at a host device (e.g., CS client) of a CS device. However, if a first application access computational memory (e.g., a CS resource) in use by a second application, the first application may modify data stored in the computational memory and corrupt execution of the second application. A compute resource (e.g., computational memory) isolation mechanism based on applications (tenants) is disclosed. According to the disclosure, a system may provide a method to identify an application (tenant), a method to manage and protect Compute Resource reference based on the application (tenant), and a method to protect Compute Resources from malicious access such as buffer overflow attack.

In some implementations, a CS session management core may provide method to identify application (tenant). Each application may have a unique session token and resource Set ID. CS requests submitted through a session (or session context) may have a unique resource set ID to identify the application. Further, a compute resource management core may manage memory range instance based on session context (e.g., based on resource set ID).

Some examples according to the disclosure further provide a mechanism to monitor which memory ranges are in use by CS commands to prevent access to a memory range by more than one CS command. Some examples, according to the disclosure provide a method to translate address from memory range object notation to CS device specific address notation.

Some examples according to the disclosure provide CS command validation logic configured to provide memory range validation, memory range boundary check and memory range address translation.

According to the some examples of the disclosure, an application can receive access to compute memory of a CS device through a memory range object (handle) rather than to direct memory addresses.

Referring to FIG. 1, a diagram of a system 100 for protecting CS resources is shown. The system 100 includes a host device 102 and a CS device 104. The host 102 is communicatively coupled to the CS device 104. In some examples, the host 102 and the CS device 104 are connected by a peripheral component interconnect express (PCIe) link. In other examples, the host 102 and the CS device 104 are connected through an Ethernet connection. It should be noted that other connection types (including wireless connections) between the host 102 and the CS device 104 are possible. Further, the host 102 and the CS device 104 may indirectly connected to each other (e.g., through one or more networks). In some examples, the host 102 and the CS device 104 communicate through non-volatile memory express (NVMe) protocol. In other examples, a different protocol is used.

The host 102 includes a processor 106 and a memory 108. The processor 106 may include a CPU, a GPU, an ASIC, an FPGA, another type of processor or a combination thereof. The memory 108 may include a volatile memory, a non-volatile memory, or a combination thereof. It should be noted that the host 102 may include additional components than shown. For example, the host 102 may include a communications interface, a user input device (e.g., a mouse, keyboard, etc.), an output device (e.g., a display, a speaker, etc.), other components, or a combination thereof. Further, the host 102 may include more than one of a component that is described or illustrated herein. For example, the host 102 may include more than one processor, more than one memory, etc. Components of the host 102 may be connected through one or more buses, one or more direct connections, or a combination thereof.

The CS device 104 includes a controller 114, a processing device 118, a memory 116, and a storage medium 120. The controller 114 may include an ASIC, FPGA, central processor unit, or other processing unit configured to process input and output operations associated with the storage medium 120. For example, in response to a write command from the host 102, the controller 114 may read data from the host 102 and write the data into the storage medium 120. As another example, in response to a read command from the host 102, the controller 114 may read data from the storage medium 120 and write the data to the host 102.

The storage medium 120 may include a non-volatile computer-readable storage medium, a volatile computer-readable storage medium, or a combination thereof. In some examples, the storage medium 120 includes flash memory.

The memory 116 may include a volatile computer-readable storage medium, a non-volatile computer readable storage medium, or a combination thereof. The memory 116 is configured to operate as an operational memory and to store program data for programs executing at the processing device 118. Program data may include program input, program output, and temporary data for program execution. In some implementations, the memory 116 and the storage medium 120 are implemented on the same physical devices.

The processing device 118 may include an ASIC, FPGA, CPU, GPU, other type of processor unit, or a combination thereof. The processing device 118 is configured to execute applications loaded into program slots. Program slots may be logical units associated with the processing device 118 and may or may not correspond to distinct physical devices (e.g., processing cores, etc.)

While not shown, the CS device 104 may include various additional components, such as a host interface layer, a flash translation layer, etc. For example, a host interface layer may be configured to translate commands received from the host 102 to a form commands recognized by the controller 114. Such translation may include translating an addressing scheme used by the host 102 to an addressing scheme used by the controller 114. The flash translation layer may translate commands from the controller 114 to a format recognized by the storage medium 120. Such translation may include translating an addressing scheme used by the host 102 to an addressing scheme used by the storage medium 120. Additionally, more than one of the components shown may be included in the CS device 104. For example, the CS device 104 may include more than one memory 116, more than one storage medium 120, more than one processing device 118, more than one controller 114, etc. Further, while not shown, the CS device 104 may include various connections between components. For example, components of the CS device 104 may be connected by a bus, by one or more direct connections, or a combination thereof. In addition, some components illustrated in FIG. 1 may be combined. For example, the controller 114 and the processing device 118 may be implemented the same processing device (or processing devices).

In operation, the host 102 may issue one or more allocation commands to allocate one or more portions of the memory 116 to one or more applications executing at the host 102. Further, the host 102 may issue input/output commands to the CS device in order to write data to or retrieve data from the storage medium 120 or the memory 116. Further, the host 102 may issue one or more CS commands to the processing device 118. A CS command may instruct the CS device to store data/instructions in the memory 116, to access data in the memory 116, to execute a program at the processing device 118, or a combination thereof. The allocation commands, input/output commands, and CS commands may be issued by one or more applications executing at the processor 106. The system 100 provides mechanisms to isolate resources of the CS device so that one application executing at the processor 106 does not interfere with resources used by another application executing at the processor 106. In particular examples, resources may be managed based on sessions.

The memory 108 stores CS management core instructions 110 executable by the processor 106 to provide a CS management core. The CS management core is configured to validate commands, prevent replay attacks, or a combination thereof. The memory 108 further stores a library 112. The library 112 may include one or more application programming interfaces (APIs) usable by the processor 106 to process allocation commands, input/output commands, CS commands, or a combination thereof for processing by the CS management core.

For example, the library 112 may include an API configured to generate session information (e.g., session token, session identifier (ID), random number, etc.) responsive to a request to create a session and/or session context from an application. Each application executed by the processor 106 may be associated with a unique session context. In order to begin passing CS commands to the CS device 104, an application may send a request to generate a new session context to an API in the library 112. Responsive to this request, the API may generate and store session information, such as a session token corresponding to a new session context for the application. A session context may include more than one session. The API may be configured to generate and store a new session ID for each session request from the application. In some examples, the API may store an initial random number for each new session. Such random numbers may be used to prevent replay attacks, as described further herein. The API may further generate a resource set ID responsive to requests to create a session and/or a session context. In some examples, each session context has its own unique resource set ID. In other examples, each session has its own unique resource set ID. In some implementations, the resource set ID is inserted into commands sent to the CS device 104 by the CS management core, as described further below.

The library 112 may further include an API configured to initiate transmission of a request to allocate memory to the CS device 104 responsive to an allocation request from an application executing at the processor 106. In some implementations, the API may insert a resource set ID into the request to allocate memory transmitted to the CS device 104. The resource set ID may identify the session context (e.g., the application) or the session (e.g., a stream within the application) requesting the allocation. The API may return a memory range object to the application responsive to the request to allocate memory. The memory range object is an abstraction of a portion of the memory 116. In some implementations, the memory range object includes a memory range ID and a size (e.g., in bytes, kilobytes, etc.).

The library 112 may further include an API configured to modify CS requests before transmission to the CS device 104. For example, the API may insert stored session information (e.g., session token, session ID, random number) into a computational request.

Further, the library 112 may include an API configured to receive memory allocation requests from applications and to return corresponding memory objects. Memory objects are an abstraction of the memory 116 of the CS device 104 and are described further herein. The library 112 may further include an API configured to add session information (e.g., a session token, a session identifier (ID), a random number, other information, or a combination thereof) to input/output commands and CS commands issuing from applications of the host 102. The CS management core may validate commands based on the additional session information. Valid commands may be passed along to the CS device 104 while invalid commands may be prevented from issuing to the CS device 104.

The CS session management core is configured to determine whether CS commands (e.g., as modified by the library 112) are valid. For example, the CS session management core may compare a received random for a command associated with a session to a stored random number associated with the session. In response to determining that the random numbers match, the CS session management core may determine that the command is valid. Valid commands may be forwarded to the controller 114. In addition, the CS management core may update the stored random number for the session with a new random number to prevent replay attacks.

The controller 114 is configured to execute compute resource manager instructions 126 to provide a compute resource manager core and to execute CS command validation instructions 124 to provide a CS command validation core. The compute resource manager core is configured to allocate memory to resource set IDs responsive to allocation requests. For example, the memory 116 may include one or more memory regions (e.g., physical or logical regions), and the compute resource manager core may allocate one or more memory ranges coming from one or more memory regions to each resource set ID. The compute resource manager core may maintain a mapping data structure (e.g., a hash table) identifying each memory range associated with a resource set ID. Each memory range may be identified by a memory range ID, a memory region ID of the memory region that includes the memory range, an offset into the memory region, and a size of the memory region. In response to an allocation request from the host 102, the compute resource manager core may identify a memory range within a memory region that satisfies the request, update a resource set ID indicated by the request to include the identified memory range, and return a memory range object identifying the memory range to the host 102. The memory range object may include the memory range ID and the size of the memory range.

In addition to allocating memory ranges, the compute resource manager core may provide translations of one or more addresses in a valid CS command to another address space (e.g., another virtual address space or to an address space of the memory 116) based on the stored mapping data structure for the resource set ID indicated by the CS command.

The CS command validation core may be configured to determine whether a received CS command is valid. For example, in response to receiving a CS command, the CS command validation core may extract a resource set ID, a memory range ID, and an offset from the computational command. The CS command may then determine whether the compute resource manager core has a mapping data structure for the resource set ID that includes mapping to the memory range ID. Further, the CS command validation core may determine whether the offset is within the memory range. In addition, the CS validation core may determine whether the memory range is in use by another CS command. One or more of these factors may be used by the CS command validation core to determine whether the CS command is valid. A more detailed description of CS validation is given further below. It should be noted that the CS command validation instructions 124 and the compute resource manager instructions 126 may be executed by a different component other than then controller 114. In some examples, the CS command validation instructions and the compute resource manager instructions 126 are executed by the processor 106 of the host 102.

Thus, CS commands from an application of the host 102 may be associated with a session/session context. The CS device 104 may manage accesses to resources (e.g., the memory 116) on a per session/session context basis to prevent one application from accessing resources of another application.

Figure 2A:
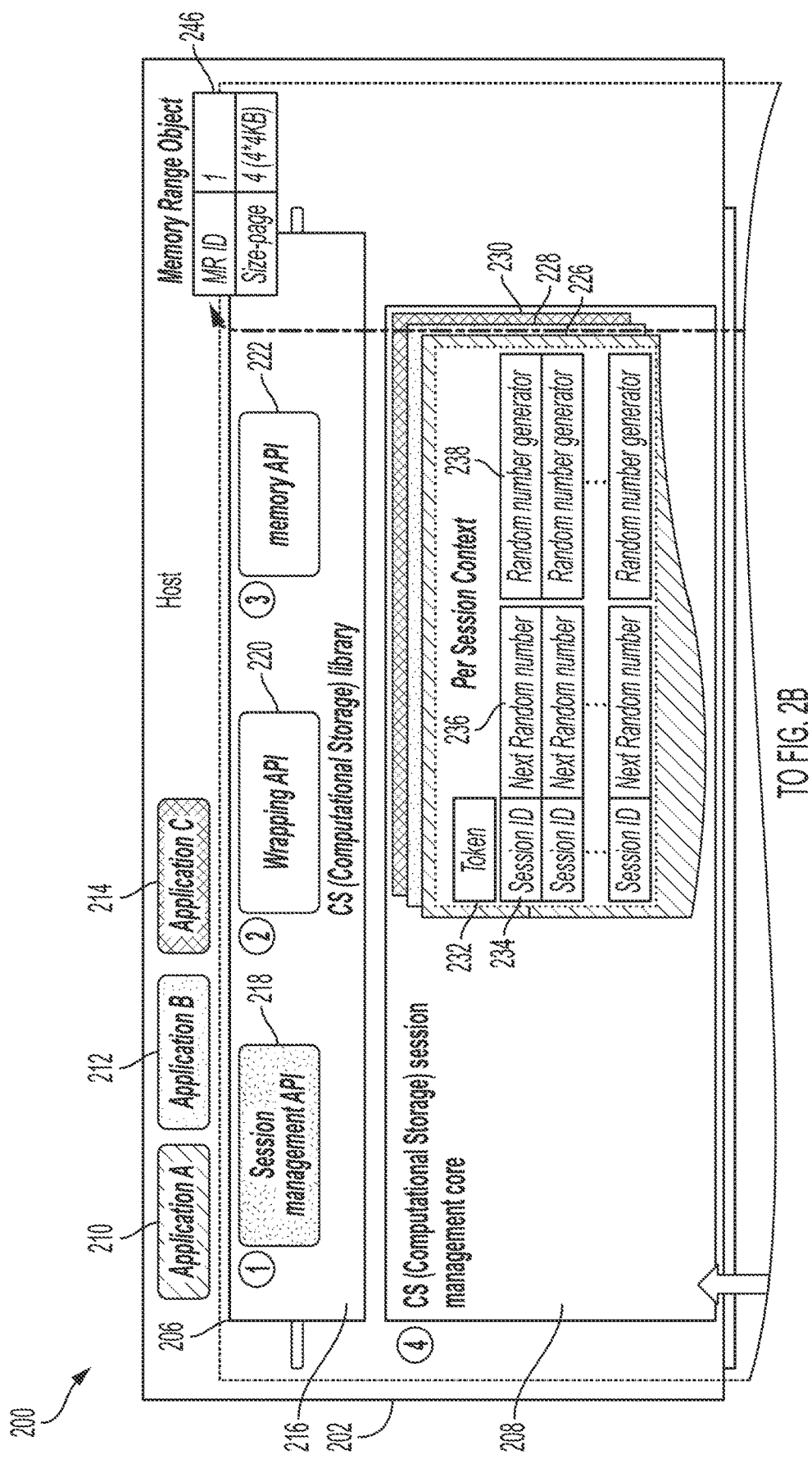
FIG. 2A is a first part of a diagram of another system for providing resource isolation in computational storage devices.
Figure 2B:
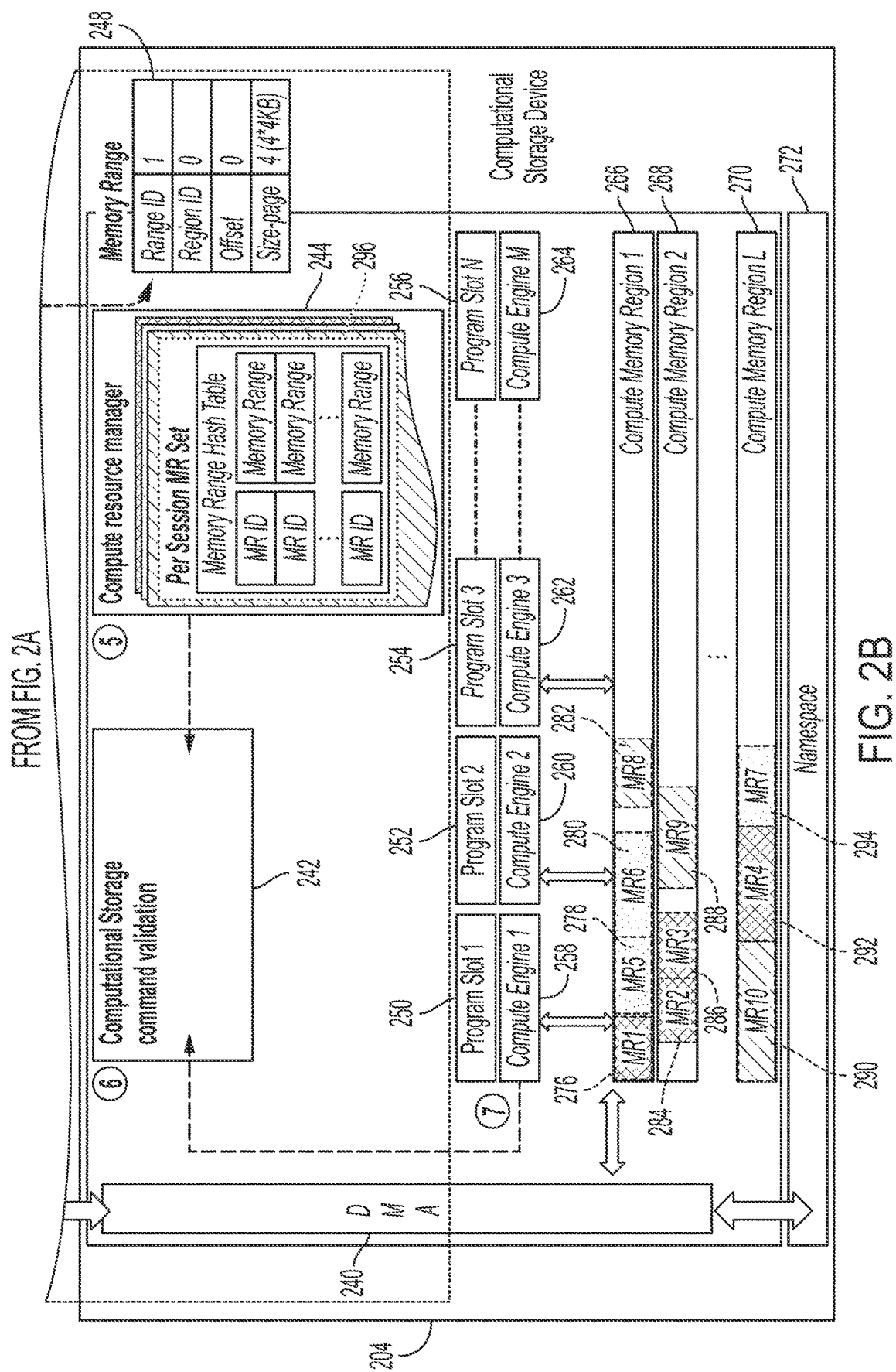
FIG. 2B is a second part of the diagram of the other system for providing resource isolation in computational storage devices.

Referring to FIGS. 2A and 2B, a diagram showing another system 200 for providing resource isolation in a CS device is shown. The system 200 may correspond to the system 100 in some implementations. The system 200 includes a host 202 and a CS device 204. The host 202 may correspond to the host 102 and the CS device 204 may correspond to the CS device 104 of FIG. 1. The host 202 executes an application A 210, an application B 212, and an application C 214 at a processor (e.g., the processor 106). The host 102 may execute a different number of applications in other examples.

The CS device 204 further provides a first program slot 250, a second program slot 252, a third program slot 254, and a Nth program slot 256. The CS device 204 may provide a different number of program slots. Each program slot corresponds to a compute engine configured to execute an application loaded into the corresponding program slot. The CS device 204 includes a first compute engine 258 corresponding to the first program slot 250, a second program slot 252 corresponding to the second compute engine 260, a third program slot 254 corresponding to the third compute engine 262, and a Mth compute engine 264 corresponding to the Nth program slot 256. It should be noted that there may not be a 1-1 correspondence between program slots and compute engines. Each compute engine is configured to execute applications in the corresponding program slot(s). The compute engines 258, 260, 262, 264 may be provided by one or more processors (e.g., the processing device 118) of the CS device 204. The compute engines 258, 260, 262, 264 correspond to an abstraction of the one or more processors.

The CS device 204 further includes a first memory region 266, a second memory region 268, and an Lth memory region 270. The CS device 204 may include a different number of memory regions in other examples. The memory regions 266, 268, 270 may correspond to physical or virtual regions of a memory (e.g., the memory 116) of the CS device 204.

The CS device 204 further includes a namespace 272. The namespace may correspond to an addressable region of a storage medium (e.g., the storage medium 120), such as a SSD. The CS device 204 may support a different number of namespaces than shown.

The CS device 20 further includes a direct memory access (DMA) engine 240 configured to retrieve data from the host 202 and to write the data to the memory regions 266, 268, 270 and the namespace 272 (e.g., responsive to CS commands from the applications 210, 212, 214).

The CS device 204 may load applications into the program slots 250, 252, 254, 256 responsive to CS commands from the applications 210, 212, 214. Further, the compute engines 258, 260, 262, 264 may execute the applications in the program slots 250, 252, 254, 256 using parameters defined by CS commands from the applications 210, 212, 214. Such parameters may include memory addresses targeted by the CS commands. The disclosed system 200 provides a mechanism to prevent CS commands from different applications (e.g., different tenants of the system 200) from accessing the same resources.

In the illustrative example, the host 202 stores a CS library 216 (e.g., the library 112) in a memory (e.g., the memory 108). The CS library 216 includes a session management API 218, a wrapping API 220, and a memory API 222. In some implementations, the APIs 218, 220, 222 may be combined into fewer APIs. The session management API 218 may be configured to create sessions/session contexts and generate associated session information (e.g., a session token, a session ID, a random number, a resource set ID, other information, or a combination thereof) responsive to requests from applications executing at the host 202. For example, responsive to requests from the applications 210, 212, 214, the session management API 218 may generate a session context for each of the applications 21, 212, 214 and store data for the session context (e.g., in the memory 108). Each session context may include a session token identifying the session context (e.g., and the associated application). Further, in some implementations, each session context may support more than one session (e.g., an application may open more than one communication session within a session context). For each session within a session context the session management API may create a session ID, a next random number and a random number generator (e.g., a seed value).

The wrapping API 220 may be configured to add session information to incoming CS requests from the applications 210, 212, 214. The session information may have been previously generated by the session management API 218 and stored (e.g., in the memory 108) responsive to a session creation request from an application. For example, the wrapping API 220 may be configured to add a session token corresponding to a requesting application. Further, the wrapping API 220 may be configured to add a session ID and next random number for the session.

The memory API 222 may be configured to receive requests to allocate memory of the CS device 204 from the applications 210, 212, 214, to forward the requests to the CS device 204, and to return memory range objects to applications 210, 212, 214. The applications 210, 212, 214 may use the memory range objects and offsets to address memory of the CS device 204 in CS commands. A memory range object may include a memory range ID of a memory range and a size of the memory range (e.g., in bytes, kilobytes, pages, etc.). FIG. 2A illustrates an example memory range object 246. In some implementations, requests to allocate memory are processed by the wrapping API 220 prior to being received at the memory API 222.

The host 202 further provides (e.g., by executing the CS management core instructions 110 at the processor 106) a CS session management core 208. In some implementations, the CS session management core 208 includes a core of an FPGA, software executable by a processor, or a combination thereof. The CS session management core 208 is configured to determine whether to authorize CS requests based on session information included in the CS requests and stored session information. In the illustrated example, the CS session management core 208 stores (e.g., in the memory 108) data related to a first session context 226 associated with the application A 210, a second session context 228 associated with the application B 212, and a third session context 230 associated with the application C 214.

The first session context 226 includes a session token 232 and information related to several sessions. A first session ID 234 for a first session is associated with a first next random number 236 and a first random number generator 238. For a CS request (or memory allocation request) received from an application, the CS session management core 208 may be configured to determine whether a session token matches a stored session token for the application. For example, in response to a CS request from the application A 210, the CS session management core may determine whether a session token in the CS requests matches the session token 232 in the first session context 226 associated with the application A 210. In response to determining there is a mismatch between the tokens, the CS session management core may determine that the CS command may be determined to be unauthorized. Further, the CS session management core 208 may determine whether a session ID included in the CS command is included in the first session context 226. If not, the CS command may be determined to be unauthorized. In response to determining that the session ID is included in the first session context 226, the CS session management core 208 may determine whether a random number included in the CS command matches an expected next random number for the session ID. In response to a mismatch between the random numbers, the CS command may be determined to be unauthorized. In response to determining that the session token, session ID, the random number, or a combination thereof of the CS device match stored values, the CS session management core 208 may determine that the CS command is authorized. In response to determining that a CS command is authorized, the CS session management core 208 may add a resource set ID to the CS command and send the CS command to the CS device 204. The resource set ID may correspond to either a session or a session context. The CS device 204 may use the resource set ID to determine what resources are valid for the CS command. Because each session context/session is associated with an application, selectively adding the resource set ID based on session context/session to authorized commands may prevent applications from accessing another application's resources at the CS device.

In some implementations, the CS session management core 208 is further configured to update a next random number for a session ID based on a stored random number generator in response to receiving an authorized command from the session ID. For example, in response to determining that a command for the first session ID 234 in the first session context 226 is authorized, the CS session management core 208 may use the first random number generator 238 to generate a new next random number to replace the first next random number 236 for the first session ID 234. Updating random numbers for session IDs in this way may prevent successful "replay" attacks in which a malicious application attempts to repeat session information previously from a previous authorized CS command.

Referring back to the CS device 204, the CS device 204 provides a CS command validation core 242 and a compute resource manager core 244 (e.g., by executing the CS command validation instructions 124 and the compute resource manager instructions 126 at the controller 114). In some implementations, the CS command validation core 242, the compute resource manager core 244, or a combination thereof include a core of an FPGA, software executable by a processor, or a combination thereof. The compute resource manager core 244 is configured to respond to memory allocation requests from the host 202 (e.g., sent through the wrapping API 220 and the memory API 222) and to maintain a data structure mapping memory range objects to memory ranges for each resource ID. In the illustrated example, the compute resource manager core 244 maintains a data structure 296 (e.g., a hash table) corresponding to a resource ID associated with the application A 210 and the first session context 226. It should be noted that in alternative examples, a resource ID may correspond to a session rather than a session context (e.g., an application may have more than one associated resource ID). The data structure 296 maps memory range objects of the application A 210 (e.g., of the first session context 226) to memory ranges. In the illustrated example, a memory range 248 is mapped to the memory range object 246. A memory range may be defined as a memory range ID, a memory region ID of the memory region that includes the memory range, an offset within the memory region, and a size. In the illustrated example, the first memory region 266 includes a first memory range 276 assigned to the application C 214 (e.g., to a resource set ID corresponding to a session context of the application A), a fifth memory range 278 and a sixth memory range 280 assigned to the application B 212, and an eighty memory range 282 assigned to the application A 210. The second memory region 268 includes a second memory range 284 and a third memory range 286 assigned to the application C 214 and a ninth memory range 288 assigned to the application A 210. The Lth memory region 270 includes a tenth memory range 290 assigned to the application A 210, a fourth memory range 292 assigned to the application C 214, and a seventh memory range 294 assigned to the application B 212. Thus, the data structure 296 may include entries mapping: a memory range ID of the eighth memory range 282 to the eighth memory range 282, a memory range ID of the ninth memory range 288 to the ninth memory range 288, and a memory range ID of the tenth memory range 290 to the tenth memory range 290.

Memory regions may be defined as {Memory region ID, size}. A memory region ID may be defined as a memory type | memory region number. Memory types may include controller memory buffer, persistent memory region, device local memory (DLM), etc. A memory range may be defined as a {memory region ID, page-offset within memory region, page-count}. In some implementations a memory range ID is a 16 bit ID, but other implementations may have memory range IDs of a different size. A memory range object may be {memory range ID, size}.

In response to a request to allocate memory, the compute resource manager core 244 may identify an available range in one of the memory regions 266, 268, 270, generate a corresponding memory range object, and store a mapping of the memory range object to the range in a data structure of a resource ID indicated by the request to allocate memory. The compute resource manager core 244 is configured to return the memory range object (e.g., the memory range object 246) to the host 202. The memory API 222 of the host 202 is configured to report the memory range object back to the requesting application which may then use the memory range object to address memory in the CS device 204 in CS commands.

The CS command validation core 242 is configured to determine whether received CS commands are valid. The CS command validation core 242 may determine whether a CS command is valid based on a resource set ID (e.g., as added to the CS command by the CS session management core 208), a data structure maintained by the compute resource manager core 244, a memory range object indicated by the CS command, a size of memory indicated by the CS command, an offset indicated by the CS command, or a combination thereof. For example, a received CS command may indicate a resource set ID and an operation to be performed based on a portion of memory at an offset into a memory range associated with a memory range object ID and having a particular size. The CS command validation core 242 may retrieve a data structure associated with the resource set ID from the compute resource manager 244 to determine whether the data structure includes the memory range object ID. The CS command validation core 242 may be configured to determine that the CS command is invalid in response to the data structure not including a reference to the memory range object ID or in response to determining (e.g., based on the offset and the particular size) that the portion of memory indicated by the CS command falls outside of the memory range indicated by the memory range object ID. The CS command validation core 242 may determine that the CS command is valid in response to determining that the memory range object ID is listed in a data structure associated with the resource set ID associated with the CS command and that the portion of memory is within the memory range associated with the memory range object ID. In some implementations, the CS command validation core 242 is further configured to determine whether another CS command is using the memory range identified by the memory range object ID in the CS command. The CS command validation core 242 may be configured to determine that the CS command is invalid in response to determining that another command is accessing the memory range or to determine that the CS command is valid in response to determining that the command is not in use. The CS command validation core 242 may maintain a data structure identifying memory ranges that are in use.

In response to determining that the CS command is valid, the CS command validation core 242 is configured to translate the memory range ID based address of the portion of the memory as indicated by the CS command to a memory region address and to forward the CS command with the translation to for execution by one of the compute engines 258, 260, 262, 264.

Thus, the CS command validation core 242 may prevent CS commands issued by an application from accessing resources (e.g., portions of memory) that are allocated to other applications (or unallocated).

In a first example use case, the application A 210 issues a session management request to the session management API 218, at 1. In response to the session management request, the session management API 218 creates (e.g., in the memory 108) the first session context 226. The session management API 218 generates the session token 232 to uniquely identify the first session context 226. Further, the session management API 218 generates the first random number generator 238 (e.g., a seed value) and uses the first random number generator 238 to generate the first next random number 236. The first next random number 236 and the first random number generator 238 are stored in the first session context 226.

The application A 210 may issue a memory allocation request, at 2. In response to the memory allocation request, the wrapping API 220 may add the session token 232, the first session ID 234, and the first next random number 236 to the memory allocation request and send the memory allocation request to the memory API 222, at 3. The memory API 222 may send the memory allocation request to the CS session management core 208 for authorization, at 4. The CS session management core 208 may determine that the memory allocation request is authorized by comparing the session token 232, the first session ID 234, the first next random number 236 indicated by the memory allocation request, or a combination thereof to values stored in the first session context 226. The CS session management core may update the first next random number 236 stored in the first session context 226 based on the first random number generator 238 and transmit the memory allocation request to the CS device 204 with a resource set ID corresponding to the first session context 226 in response to determining that the memory allocation request is authorized.

In response to the memory allocation request, the compute resource manager core 244 may allocate the tenth memory range 290, at 5. The memory allocation request may allocate the tenth memory range 290 based on a requested size in the allocation request, a requested memory region type in the allocation request, or a combination thereof. For example, the tenth memory range 290 may be selected from the Lth memory region 270 in response to the Lth memory region 270 corresponding to a memory type requested in the memory allocation request. The compute resource manager core 244 may store a mapping between a memory range ID of the tenth memory range 290 in the data structure 296 and return a memory range object indicating the memory range ID and size of the tenth memory range 290 to the memory API 222. The memory API 222 may return the memory range object to the application A 210.

The application A 210 may issue a CS command targeting a portion of the tenth memory range 290 to the wrapping API 220, at 2. The wrapping API may add the session token 232, the first session ID 234, and the updated random number to the CS command based on the first session context 226. The portion of tenth memory range 290 may be identified by the memory range ID of the tenth memory range 290, offset within the memory range, and a size.

The CS session management core may determine whether the CS command is authorized by comparing the session token 232, the first session ID 234, the updated random number, or a combination thereof to data stored in the first session context 226. In response to determining that the CS command is authorized, the CS session management core 208 may update the updated random number stored in the first session context 226 based on the first random number generator 238, add a resource set ID corresponding to the first session context 226, and transmit the CS command to the CS device 204. In alternative examples in which a session context matching the session token 232 is not found, the first session ID 234 is not found within the first session context 226, or the updated random number does not match the first session ID 234, the CS session management core 208 may determine that the CS command is not authorized.

The CS command validation core 242 may receive the CS command and determine whether the CS command is valid based on the resource set ID and the memory region ID, at 6. For example, the CS command validation core 242 may retrieve the data structure 296 corresponding to the resource set ID indicated in the CS command and determine that the data structure 296 includes the memory region ID of the tenth memory range 290 indicated by the CS command. Further, the CS command validation core 242 may determine that the portion is within the tenth memory range 290 based on a size of the tenth memory range 290 indicated by the data structure 296, the offset indicated by the CS command, and the size indicated by the CS command. Further, the CS command validation core 242 may determine that an additional data structure indicates that the tenth memory range 290 is not in use by another CS command. Accordingly, the CS command validation core 242 may determine that the CS command is valid. In alternative examples in which the tenth memory range 290 is not listed in the data structure 296, the portion falls outside of the tenth memory range 290, or the tenth memory range is in use by a another CS command, the CS command validation core 242 may determine that the CS command is not valid. In response to determining that the CS command is valid, the CS command validation core 242 may translate an address of the portion of the tenth memory range 290 to an address within (e.g., offset and size) within the Lth memory region 270 and forward the CS command with the translated address to the first program slot 250 for execution by the first compute engine 258, at 7.

Thus, the system 200 may provide access to resources of the CS device 204. Further, access to the resources is managed in a per-session context fashion such that applications are prevented from accessing resources of another application or unallocated resources.

Figure 3A:
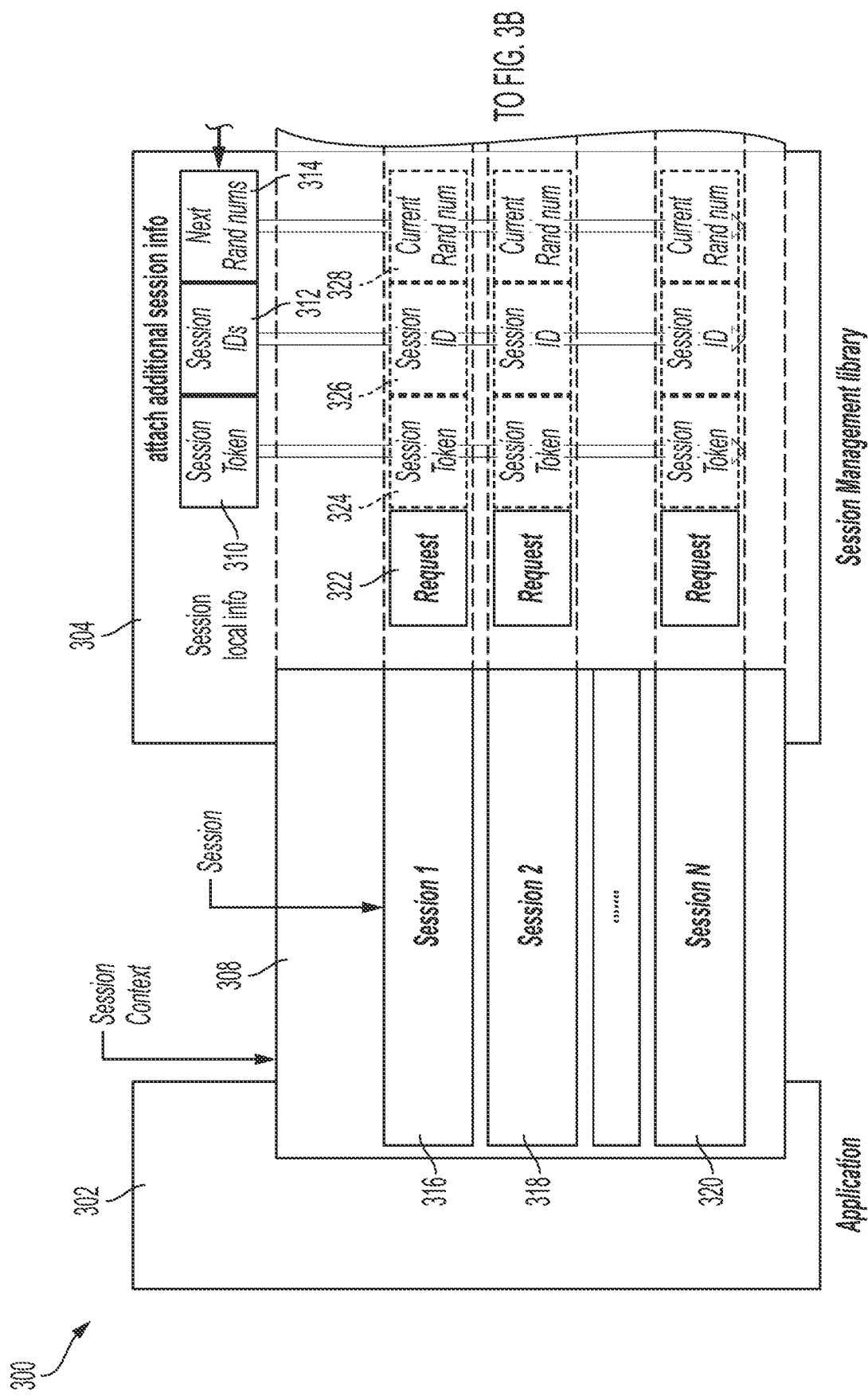
FIG. 3A is a first part of a diagram depicting modifications to a computational storage command that may occur in a host in a system for providing resource isolation in computational storage devices.
Figure 3B:
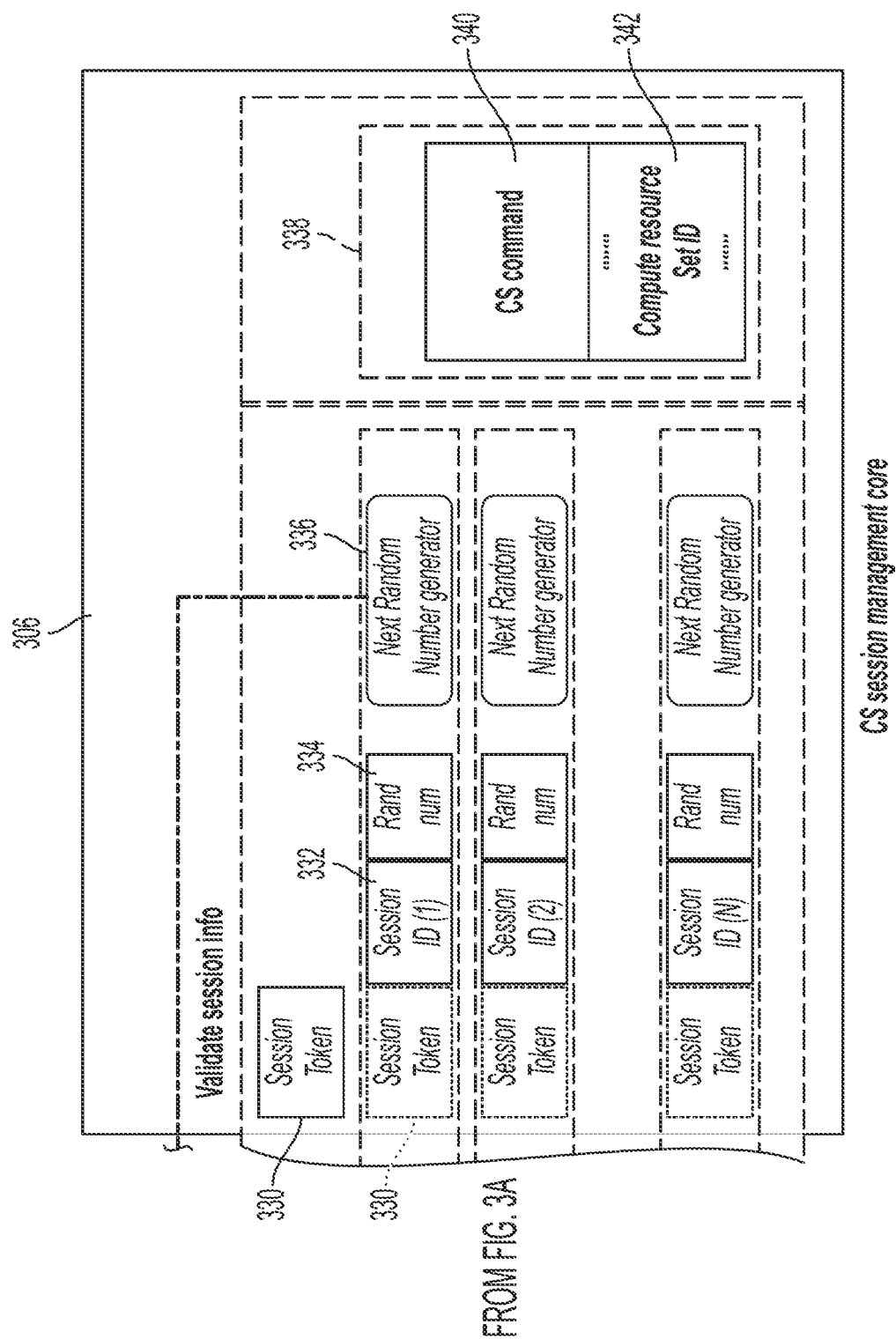
FIG. 3B is a second part of the diagram depicting modifications to a computational storage command that may occur in a host in a system for providing resource isolation in computational storage devices.

FIGS. 3A and 3B depict a diagram 300 illustrating CS command modification that occurs within a host, such as the host 102 or the host 202. As shown in the diagram a host maintains a session context 308 for an application 302. For example, the session context may be created by the session management API 218 of FIG. 2A. In the illustrated example, the session context 308 includes a first session 316, a second session 318, and an Nth session 320. A session management library 304 (e.g., the wrapping API 220 of FIG. 2A) is configured to receive CS requests and add session information (e.g., a session token information, session ID information 312, and next random number information 314) into each request. In the illustrated example, a first request 322 is received as part of the first session 316. Accordingly, the session management library 304 inserts a message session token 324 of the session context 308, a message session ID 326 associated with the first session 316, and a message current random number 328 associated with the first session 316.

A CS session management core 306 (e.g., the CS session management core 208) is configured to determine whether the first request 322 is authorized by comparing an actual session token 350 for the session context 308 to the message session token 324, comparing an actual session ID 332 of the first session 316 to the message session ID 326, and comparing an actual current random number 334 associated with the first session 316 to the message current random number 328.

In response to determining that the first request 322 is authorized, the CS session management core 306 may update the next random number information for the first session 316 using a random number generator 336 (e.g., a seed value) for the first session 316. Further, the CS session management core 306 may package the first request 322 in a CS command 340 and transmit the CS command 340 with a compute resource set ID 342 as part of a message 338 to a CS device. Thus, an authorized request may be transmitted with a resource set ID associated with an application that issued the authorized request. The CS device may use the resource set ID to validate the CS command 340. It should be noted that in some implementations, each of the sessions 316, 318, 320 may have a unique resource set ID.

Figure 4:
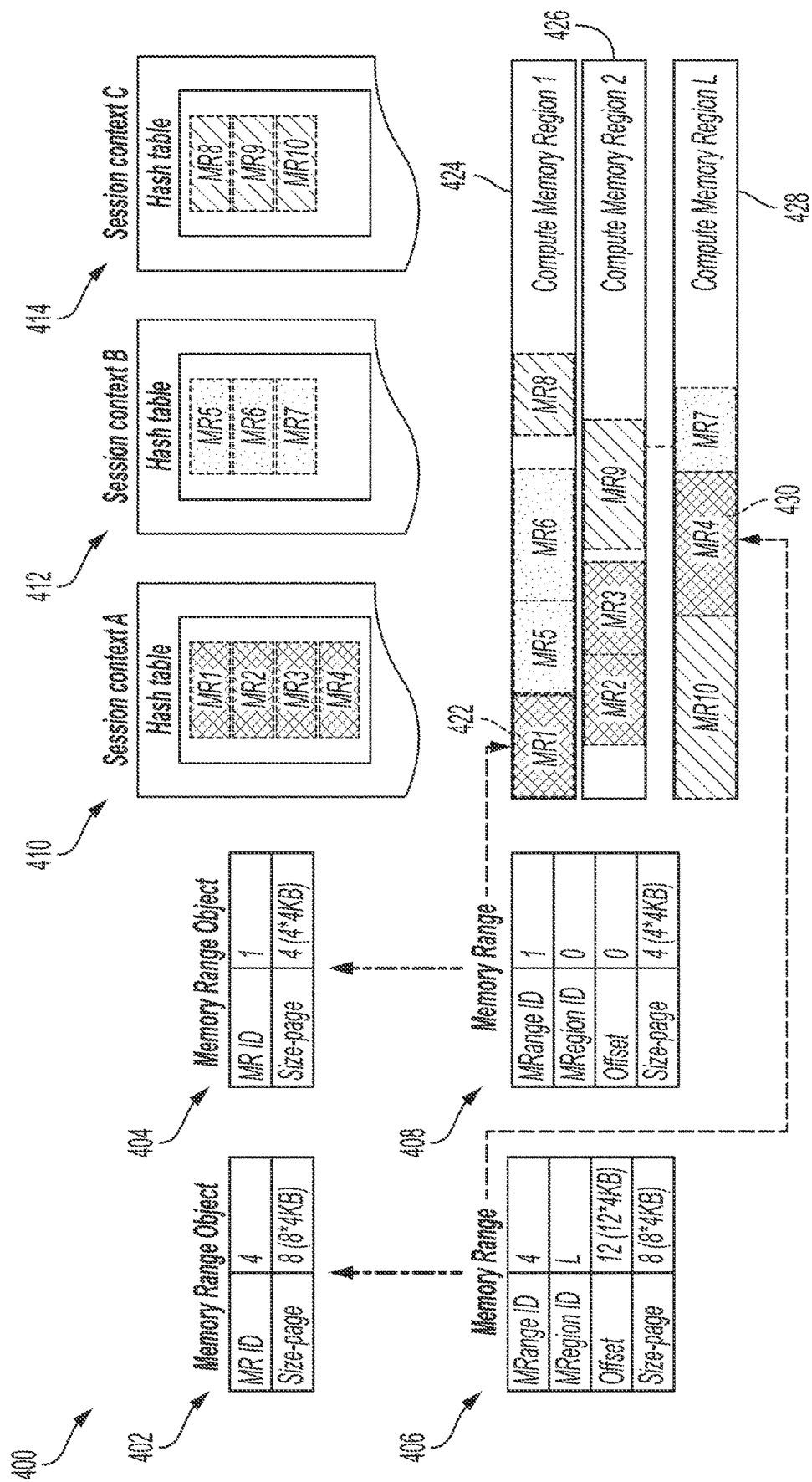
FIG. 4 is a diagram depicting relationships between memory ranges and memory regions in a system for providing resource isolation in computational storage devices.

FIG. 4 is a diagram 400 showing relationships between memory ranges and memory regions. The diagram 400 illustrates a first memory region 424, a second memory region 426, and an Lth memory region 428 of a memory (e.g., of the memory 116) of a CS device. The memory regions include memory ranges allocated to one of a first session context 410, a second session context 412, and a third session context 414. A CS device (e.g., the compute resource manager core 244) may maintain, for each session context, a data structure (e.g., a hash table) linking associated memory range IDs to memory ranges. As shown in FIG. 4, an association between a memory range ID and a first memory range 422 located in the first memory region 424 is stored in a hash table of the first session context 410. Similarly, an association between a memory range ID and a fourth memory range 430 located in the Lth memory region 428 is stored in the hash table of the first session context. Additionally, the first session context includes information related to a second memory range and a third memory range located in the second memory region. The second session context 412 includes information related to a fifth memory range and a sixth memory range in the first memory region 424 and a seventh memory range in the Lth memory region 428. The third session context 414 includes information related to an eighth memory range in the first memory region 424, a ninth memory range in the second memory region 426, and a tenth memory range in the Lth memory region 428.

Information stored in the hash table of a session context may include memory range ID, associated memory region ID, offset of the memory range within the memory region, and size of the memory range. For example, the first session context 410 related to the first memory range 422 may include first information 408. The first information 408 includes memory Range ID, a memory region ID of the first memory region 424, an offset within the first memory region 424, and a size of the first memory range 422. However, a memory range object 404 representing the first memory range 422 may be returned to a host device for use in addressing the first memory range 422 rather than all of the first information 408. The memory range object 404 includes the memory range ID of the first memory range 422 and the size of the first memory range 422. Accordingly, an application may be prevented from directly addressing a memory region. Similarly, the hash table for the first session context 410 may store second information 406 (e.g., memory range ID, memory region ID, offset within memory region, size of memory range) related to the fourth memory range 430, but return a memory range object 402 (memory range ID and size) to a host device for use addressing the fourth memory range 430.

Figure 5:
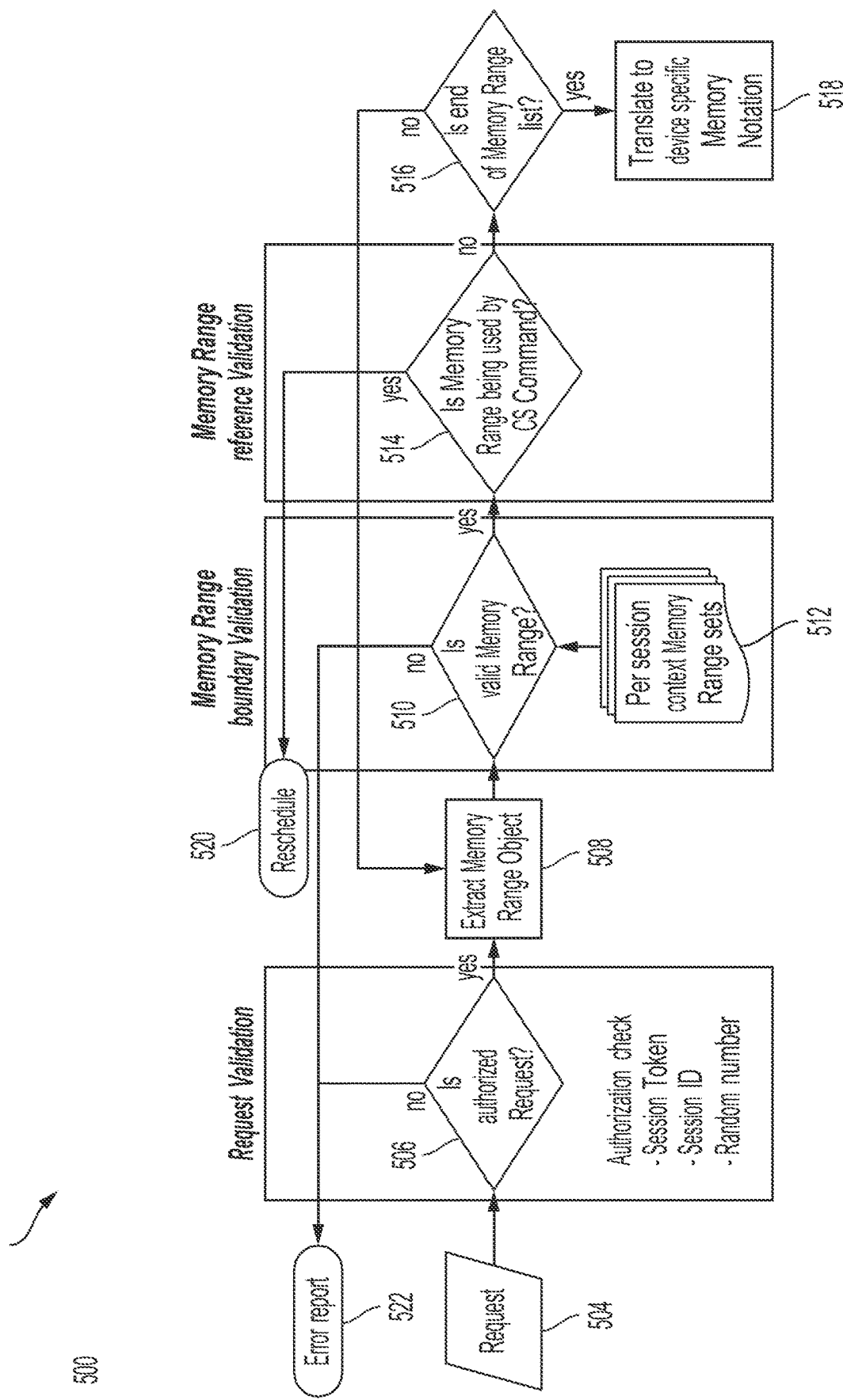
FIG. 5 is a flowchart of a method for providing resource isolation in computational storage devices.

FIG. 5 is a flowchart illustrating a method 500 of providing resource isolation in a CS device. In some implementations the method 500 is performed by the system 100, the system 200, or a combination thereof. The method 500 includes receiving a CS request from an application, at 504. For example, the CS session management core 208 may receive a CS command from the application A 210 (e.g., as modified by the wrapping API 220).

The method 500 further includes determining whether the request is authorized, at 506. For example, the CS session management core 208 may extract a session token (e.g., a message session token), a session ID (e.g., a message session ID), and a next random number (e.g., a message next random number) from the CS request and compare these values to stored values in the first session context 226 to determine whether the CS request is authorized. The CS session management core 208 may determine that the CS request is not authorized in response to determining that the message session token does not match the session token 232 of the first session context 226, that the message session ID is not present in the first session context 226, or that the a stored random number associated with the message session ID in the first session context 226 does not match the message next random number. Alternatively, the CS session management core 208 may determine that the CS request is authorized in response to determining that the message session token matches the session token 232, that the message session ID is located within the first session context 226, and that a next random number identified for the message session ID in the first session context 226 matches the message next random number.

In response to determining that the CS request is not authorized, the method 500 includes outputting an error report, at 502. For example, the CS session management core 208 may trigger output of an error report in response to a determination that the CS request is not authorized.

In response to determining that the CS request is authorized, the method 500 includes adding a resource set ID to the CS request and transmitting the CS request to a CS device, where a memory range object is extracted from the CS request, at 508. For example, the CS command validation core 242 may extract a memory range object (e.g., memory range ID and size), an offset within a CS range, and a size of a memory access within the memory range from the CS request.

The method 500 further includes determining whether the CS request requests valid access to a memory range, at 510, based on per session context memory range sets 512. For example, the CS command validation core 242 may determine whether the memory range ID indicated by the memory range object extracted from the CS request is present in the data structure 296 (e.g., hash table) for the first session context 226. The data structure 296 may be identified based on the resource ID in the CS request. The CS request may be determined to be invalid if the memory range ID is absent from the data structure 296. Further, the CS command validation core 242 may determine whether requested access of the memory range falls outside of the memory range based on a size of the memory range an offset into the memory range and a size of requested access. The CS request may be determined to be invalid if the requested access falls outside of the memory range. For example, a requested access of 8 KB beginning at offset 0 KB in a memory range that is size 4 KB may be invalid because the requested access would exceed a boundary of the memory range.

The method 500 includes outputting an error report in response to determining that the CS request is not valid, at 522. For example, the CS command validation core 242 may return an error message to the host 202.

In response to determining that the CS request requests valid access to the memory range, the method 500 includes determining whether the memory range is being used by another CS command, at 514. For example, the CS command validation core 242 may maintain a data structure indicating which memory ranges are in use by CS commands. The CS command validation core 242 may determine whether the memory range requested by the CS request is in use based on this data structure.

In response to determining that the memory range is in use, the method 500 includes rescheduling the CS request, at 520. For example, the CS command validation core 242 may hold the CS request in a buffer and recheck the in-use data structure at a later time.

In response to determining that the memory range is not use by another CS request, the method 500 includes determining whether an end of a list of memory objects identified by the CS request has been reached, at 516. For example, the CS command validation core 242 may determine whether the CS request includes references to an additional memory object.

In response to determining that the CS request the end of the list has not been reached, the method 500 returns to 508 and extracts the next memory range object.

In response to determining that the end of the list has been reached, the method 500 includes translating references to memory ranges to device specific memory notation, at 518. For example, the CS command validation core 242 may translate references to memory ranges to references to memory regions based on information stored in the data structure 296. An example of address translation logic includes the following pseudocode: new address notation={Get-Start-Address Memory-Region (Memory Region ID)+page-offset*page size+offset, size}.

Thus, the method 500 may be used to provide access to CS resources based on session context. Accordingly, resources may be isolated and unauthorized access may be prevented.

Figure 6:
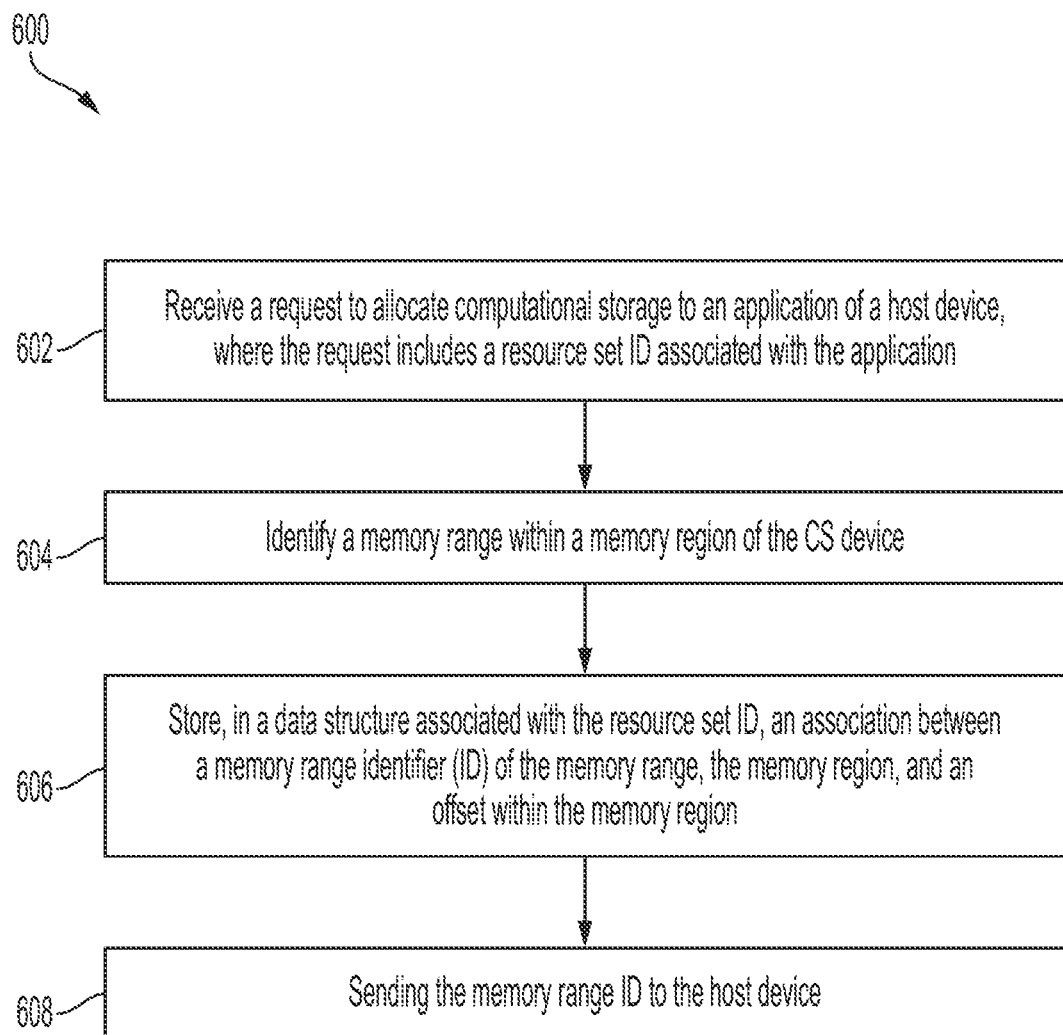
FIG. 6 is a flowchart of a method of allocating memory ranges in a systems for providing resource isolation in computational storage devices.

Referring to FIG. 6, a method 600 of responding to memory allocation requests is shown. The method 600 may be performed by a CS device, such as the CS device 104 or the CS device 204 or by a host device, such as the host 102 or the host 202.

The method 600 includes receiving a request to allocate computational storage to an application of a host device, where the request includes a resource set ID associated with the application, at 602. For example, the compute resource manager core 244 may receive a request to allocate computational storage of the CS device 204 to the application A 210. The request may include a resource set ID associated with the application A 210 (and the first session context 226).

The method 600 further includes identifying a memory range within a memory region of the CS device, at 604. For example, the compute resource manager core 244 may identify the tenth memory range 290 within the Lth memory region 270. The compute resource manager core 244 may select the Lth compute region 270 to allocate the tenth memory range 290 based on a size of memory available in the Lth memory region 270 compared to a size requested by the request, based on whether a type of the Lth memory region 270 matches a memory type requested by the request, or a combination thereof.

The method 600 further includes storing, in a data structure associated with the resource set ID, an association between a memory range ID of the memory range, the memory region and an offset within the memory region, at 606. For example, the compute resource manager core 244 may store an association between a memory range ID of the tenth memory range 290 and a size of the tenth memory range 290 and an offset (e.g., location) of the tenth memory range 290 within the Lth memory region 270 in the data structure 296. The data structure 296 is associated with the resource set ID (e.g., the compute resource manager core 244 may maintain a separate data structure for each unique resource set ID).

The method 600 further includes sending the memory range ID to the host device, at 608. For example, the compute resource manager core 244 may return a memory range object identifying the memory range ID of the tenth memory range 290 and a size of the tenth memory range 290 to the host 202.

Thus, the method 600 may be used to manage allocation of memory ranges on a per resource set (e.g., session context) basis. Accordingly, each application of the host may be allocated its own memory range(s).

Figure 7:
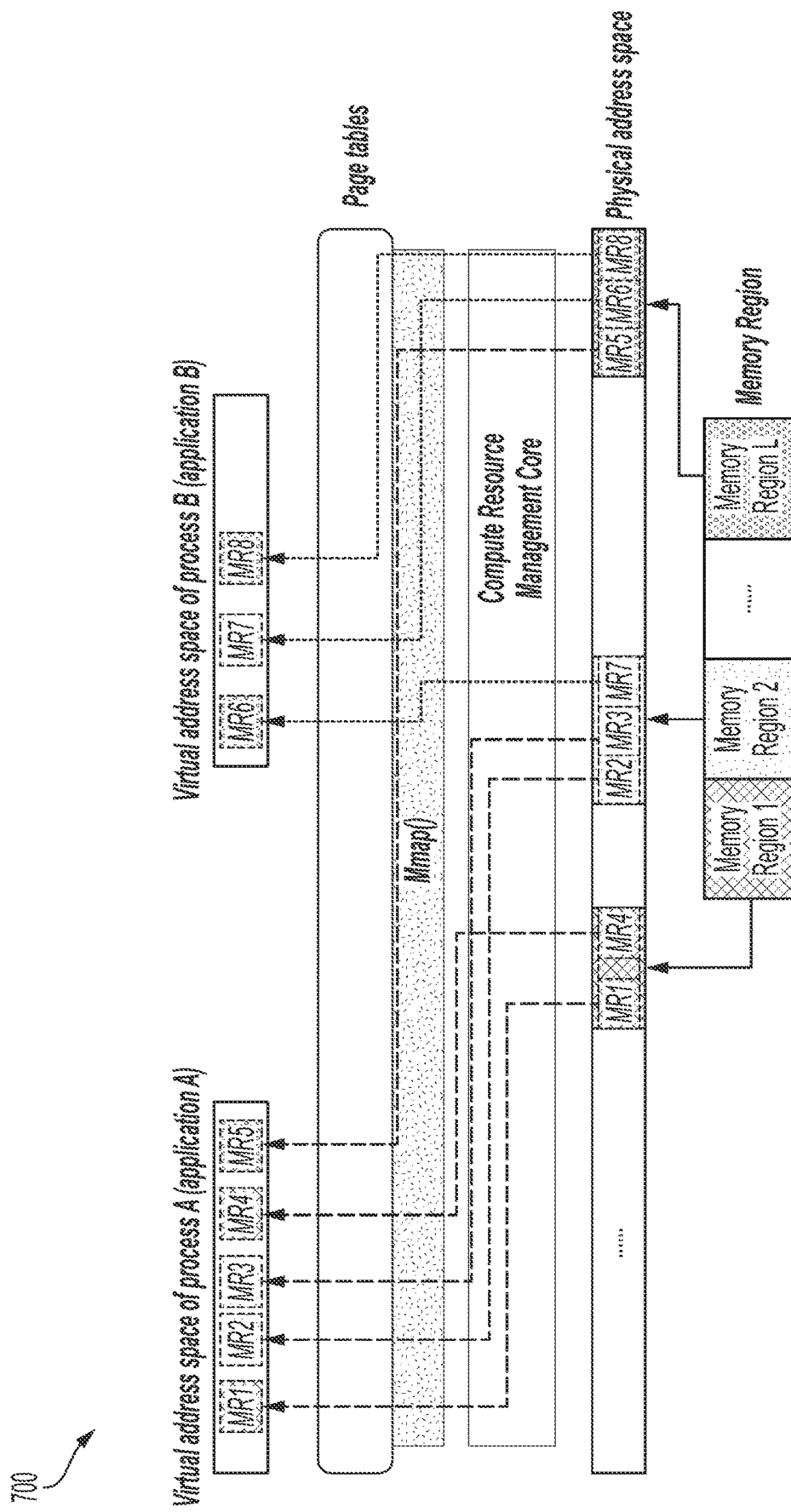
FIG. 7 is a diagram illustrating compute resource management in an alternative system for providing resource isolation in computational storage devices.

Some CS devices may support controller memory buffer style memory models in which memory regions are exposed to a host through PCI configuration register base address register. In such implementations, the host may manage memory range allocations. In some implementations, the host may simply implement a compute resource management core as described above. In an alternative example depicted in FIG. 7, a compute resource management core of a system 700 exposes physical address descriptors in memory range objects. In such examples, a CS library (e.g., the library 112 of FIG. 1) may be modified to map memory range address space to an application's virtual address space through posix mmap( ) API.

In some examples, X corresponds to Y based on X matching Y. For example, a first ID may be determined to correspond to a second ID that matches (e.g., has a same value as) the first ID. In other examples, X correspond to Y based on X being associated with (e.g., linked to) Y. For example, X may be associated to Y by a mapping data structure.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Arca Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an radio frequency identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving, at a controller of a computational storage (CS) device, a request to allocate computational memory to an application of a host device, wherein the request includes a first identifier (ID) and a second identifier associated with the application;
   identifying a first memory range and a second memory range of the CS device;
   storing, in a data structure associated with the first ID, a first indication of the first memory range;
   storing, in the data structure associated with the second ID, a second indication of the second memory range; and
   sending the first indication of the first memory range to the host device.

2. The method of claim 1, further comprising:
   receiving a CS command including the first ID and a third ID; and
   determining whether the CS command is valid based in part on whether the data structure associated with the first ID includes the third ID.

3. The method of claim 2, wherein determining whether the CS command is valid further includes, in response to determining that the first ID includes the third ID, determining whether an offset with respect to the first memory range and a size of access by the CS command exceeds a boundary of the first memory range.

4. The method of claim 3, further comprising translating the offset to a second offset with respect to the first memory range based on the data structure in response to determining that CS command is valid.

5. The method of claim 2, further comprising returning an error report to the host device in response to determining that the CS command is invalid.

6. The method of claim 2, further comprising determining whether a third memory range associated with the third ID is in use by another CS command.

7. The method of claim 6, further comprising rescheduling execution of the CS command in response to determining that the third memory range is in use by another CS command.

8. The method of claim 1, further comprising selecting the memory range based at least in part on the memory range corresponding to a memory type indicated by the request to allocate computational memory.

9. A computational storage (CS) device comprising:
   a memory; and
   a controller configured to:
      receive a request to allocate computational memory to an application of a host device, wherein the request includes a first identifier (ID) and a second identifier associated with the application;
      identify a first memory range and a second memory range of the memory;
      store, in a data structure associated with the first ID, a first indication of the first memory range;
      store, in the data structure associated with the second ID, a second indication of the second memory range; and
      send the first indication of the first memory range to the host device.

10. The CS device of claim 9, wherein the controller is further configured to:
    receive a CS command including the first and a third ID; and
    determine whether the CS command is valid based in part on whether the data structure associated with the first ID includes the third ID.

11. The CS device of claim 10, wherein determining whether the CS command is valid further includes, in response to a determination that the first ID includes the third ID, determining whether an offset with respect to the first memory range and a size of access by the CS command exceeds a boundary of the first memory range.

12. The CS device of claim 11, wherein the controller is further configured to translate the offset to a second offset with respect to the first memory range based on the data structure in response to determining that CS command is valid.

13. The CS device of claim 10, wherein the controller is further configured to return an error report to the host device in response to determining that the CS command is invalid.

14. The CS device of claim 10, wherein the controller is further configured to determine whether a third memory range associated with the third ID is in use by another CS command.

15. The CS device of claim 14, wherein the controller is further configured to reschedule execution of the CS command in response to determining that the third memory range is in use by another CS command.

16. The CS device of claim 9, wherein the data structure comprises a hash table.

17. The CS device of claim 9, wherein the controller is further configured to send a size of the first memory range to the host device.

18. A system comprising:
a host device configured to:
store a session context identifying an application executing at the host device, the session context associated with a first identifier (ID) and a second ID;
in response to receiving a request to allocate computational memory from the application, add the first ID to the request; and
send the request to allocate computational memory including the first ID to a computational storage device.

19. The system of claim 18, wherein the request to allocate computational memory is associated with a third ID and a random number, and wherein the host device is further configured to determine whether the third ID and the random number match an expected third ID and expected random number associated with the session context.

20. The system of claim 19, wherein the host device is further configured to store an updated expected random number associated with the third ID.

* * * * *